United States Patent [19]

Krieg

[11] 4,143,862

[45] Mar. 13, 1979

[54] APPARATUS FOR CUTTING PIPES, PLATES AND THE LIKE

[75] Inventor: Adrian H. Krieg, Yorktown, N.Y.

[73] Assignee: Widder Corporation, Naugatuck, Conn.

[21] Appl. No.: 614,431

[22] Filed: Sep. 18, 1975

[51] Int. Cl.² .............................................. B23R 7/04
[52] U.S. Cl. .......................................... 266/56; 266/60
[58] Field of Search ................. 148/9; 266/54, 56, 58, 266/60, 70; 219/125, 125 PL; 318/576, 577

[56] References Cited

U.S. PATENT DOCUMENTS

| | | | |
|---|---|---|---|
| 1,826,164 | 10/1931 | Carrier, Jr. et al. | 266/54 |
| 2,401,721 | 6/1946 | Chouinard | 266/58 X |
| 3,063,697 | 11/1962 | Galezniak | 266/58 X |
| 3,081,990 | 3/1963 | Bromley | 266/58 |
| 3,464,685 | 9/1969 | Schreib | 266/58 X |
| 3,555,239 | 1/1971 | Kerth | 266/58 X |
| 3,936,714 | 2/1976 | Marshall et al. | 266/60 X |

FOREIGN PATENT DOCUMENTS 2410080  9/1975  Fed. Rep. of Germany ...... 219/125 R

*Primary Examiner*—Roy Lake
*Assistant Examiner*—Paul A. Bell

[57] ABSTRACT

An apparatus for cutting welding or otherwise working pipes, plates and the like, in which a tool is mounted for rotatable movement at an angle to the surface of the workpiece. The tool is carried by a carriage which slidably supports a bracket having a first arm and a second arm. Both arms have optical scanners at one end. One scanner senses the angle the carriage is to be rotated around the pipe and the other the amount of rotation of the tool that determines the angle of attack of the tool relative to the work piece. The scanners sense profile curves, drawn to the desired shape of the surface to be cut, determining the linear movement of the tool and the angle of rotation of the tool.

10 Claims, 14 Drawing Figures

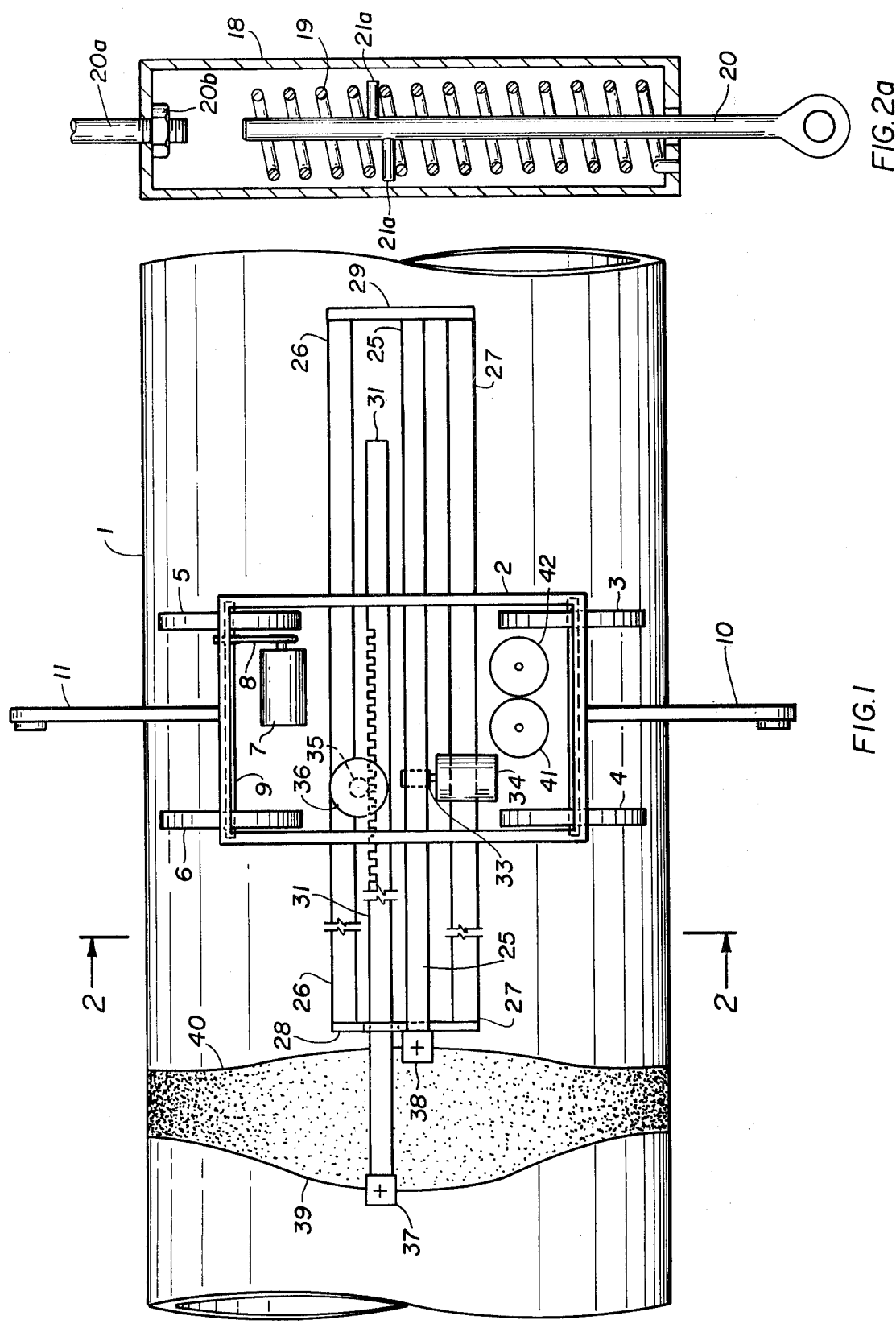

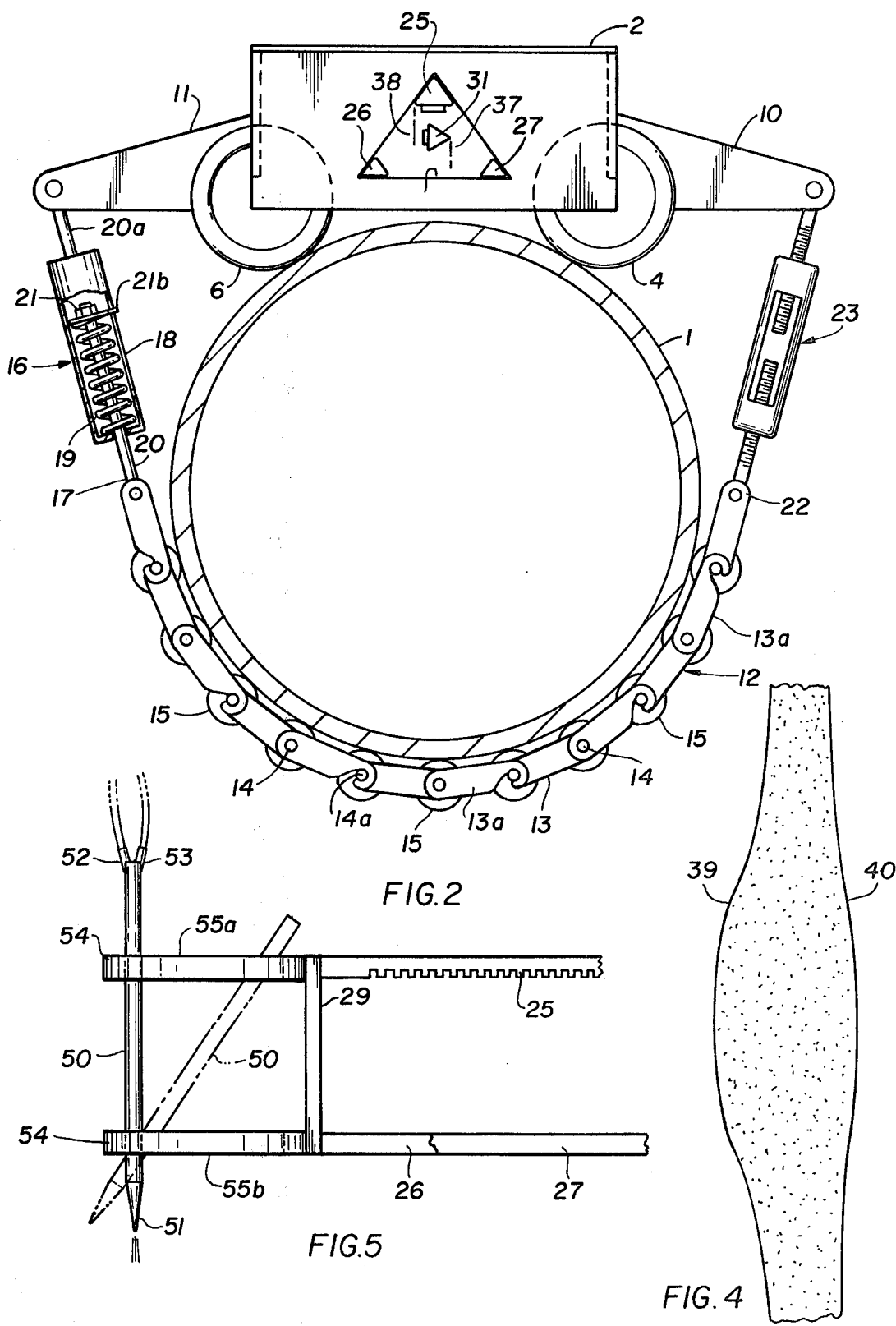

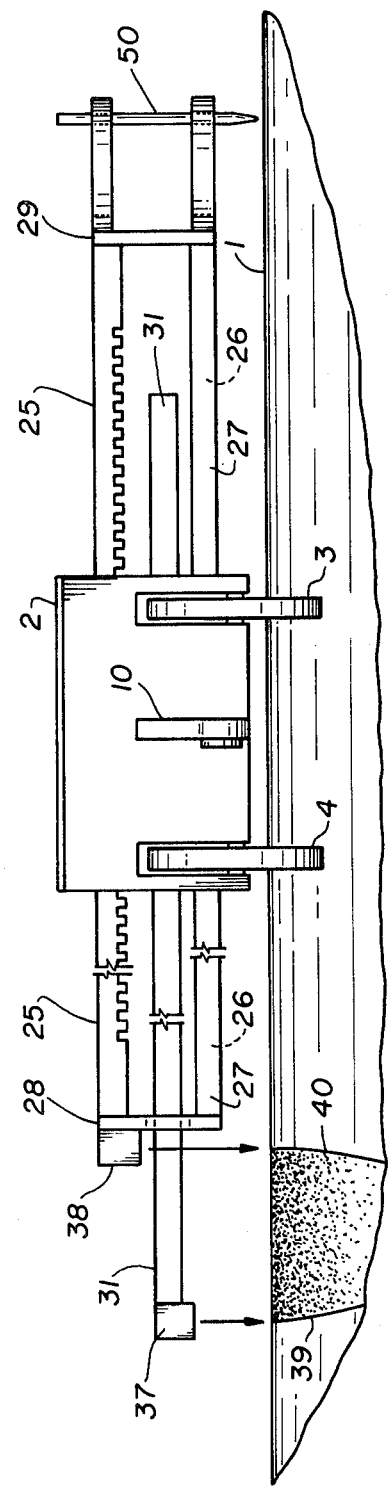
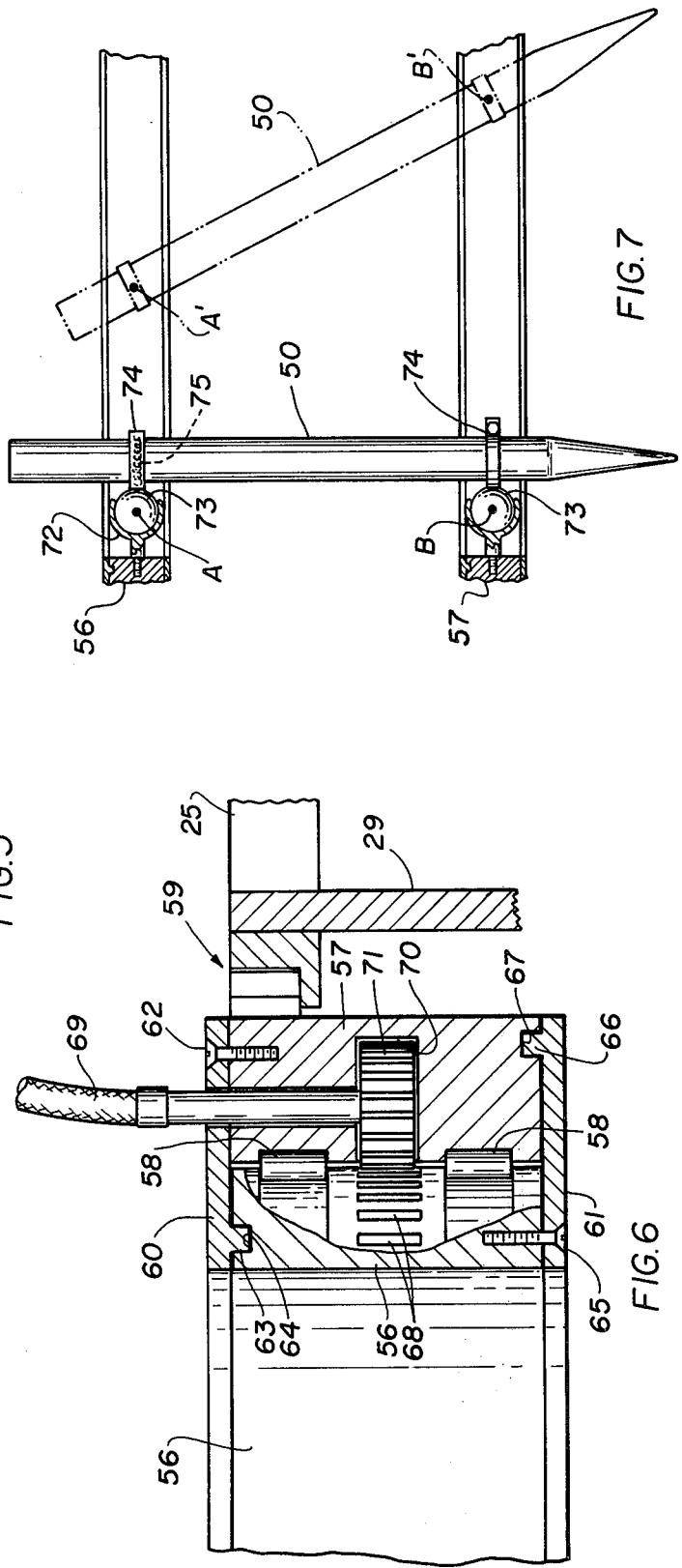

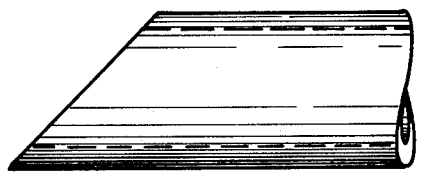
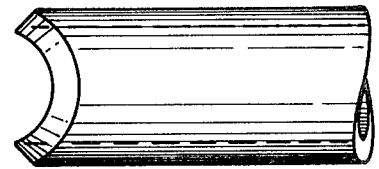
FIG.8                    FIG.9
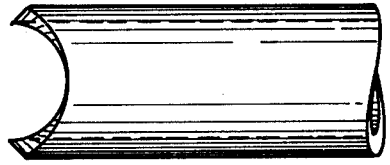
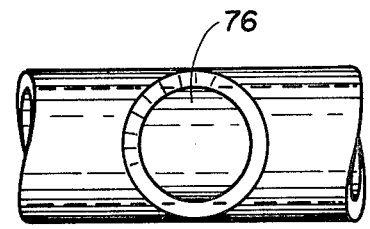
FIG.10                    FIG.11
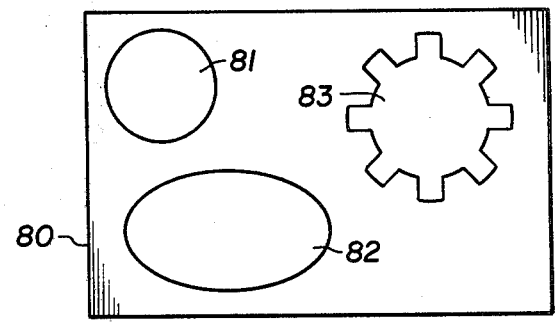
FIG.12
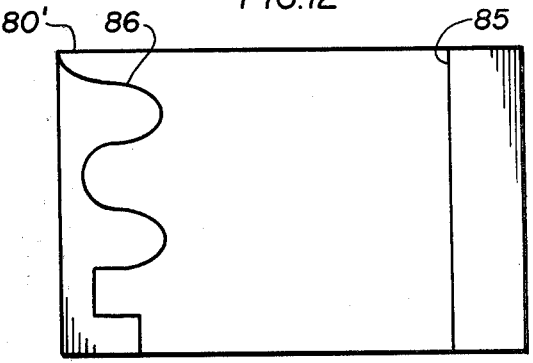
FIG.13

APPARATUS FOR CUTTING PIPES, PLATES AND THE LIKE

BACKGROUND OF THE INVENTION

The present invention is directed to the cutting, welding, or otherwise working pipes, plates, tank ends, and the like, and in particular to apparatus for performing precise angular manipulations on or in such members.

Amongst the applications for the present apparatus, the cutting of pipe or sheets, with varying shape cuts, and angular bevels is of prime interest. As a result the present disclosure is directed to illustrating the apparatus for such use, the other uses will be obvious from such illustrations.

There are many known devices in the prior art for cutting pipes and the like at a desired angle of cut. The prior art teaches making profiled cuts of different shapes such as angle cuts, holes, saddle cuts and the like.

U.S. Pat. No. 3,063,697 and U.S. Pat. No. 3,166,670 both show welding a pipe with an oxyacetylene torch, which torch is rotated around the pipe by a chain and sprocket arrangement. The angle at which the torch rotates around the pipe may be adjusted by positioning a cam plate at the desired angle. A roller urged into an engagement with the cam plate is connected to a slidable mounting means carrying the torch. Therefore, as the roller is urged by the cam plate, which has been preset, at the desired angle, the torch will rotate about the pipe at that angle. By the choice of the profile of the cam plate, a saddle cut, a straight angle cut, or numerous other cuts may be formd in the cut surface of the pipe. For a saddle cut, for example, such a cam plate would have a bulge in the center thereof.

U.S. Pat. No. 2,408,517 shows apparatus with the same principle of operation as the above two patents. The main difference is in the means for rotating the torch around the pipe. This patent shows also an adjustable torch head which may be angularly rotated before cutting to attain a desired angular bevel cut. Such bevel cut refers to the angle which the solid portion of the pipe is cut.

U.S. Pat. No. 2,990,169 shows another form of a pipe cutting apparatus where a torch head may be adjusted before cutting to also attain a desired angular bevel cut.

In all of the prior art devices, there is no way to adjust the bevel cut while the torch is being rotated. Thus, when the torch head is set to its preset angular position, in those prior art devices that allow for such adjustment, the bevel is cut at a constant angle throughout.

Further, these prior art devices can, on the most part, be used only for cutting pipes. U.S. Pat. No. 2,990,169 discloses an apparatus that may also be used for cutting holes, but such an apparatus is complicated and unwieldy.

It is an object of the present invention to provide a cutting apparatus that is capable of not only cutting pipes, but also capable of cutting plates, tank ends, and the like, and which may also be used for cutting holes in same.

It is another object of the present invention to provide a means of cutting or welding plates, tanks, and dished members without the use of mechanical peripheral equipment to control the movements of the cutting or welding head, which, as a result restrict the size and working capacity of the device since such peripheral objects mechanically limit the apparatus.

It is another object of the present invention to provide an adjustable torch head where angle of cut may be continually altered as it cuts. Such torch head has the characteristic that it is possible to continually alter the angle of bevel cut while it is cutting a pipe, or the like.

It is a further object of the present invention to provide an apparatus for cutting pipes, or the like, that is easily maneuverable and transportable.

It is still a further object of the present invention to provide an apparatus that may be used for welding two cut pieces together. Such use of the present invention would substitute an electric arc for the torch.

It is still a further object of the present invention to provide an apparatus that is automatic and simple to operate.

The foregoing objects, together with other objects and advantages are set forth in the foregoing disclosure of the present invention.

SUMMARY OF THE INVENTION

According to the present invention, apparatus for cutting metal pipe sheets or the like is provided comprising a carriage adapted to be mounted for rotation around a pipe or along a sheet to be cut. Slidably mounted in the carriage is a bracket frame for supporting the torch used in the cutting process. The carriage also has a first slidable arm parallel to and connected with the bracket, and a second arm slidable with respect to the bracket and the first arm.

The torch is mounted for adjustable positioning so that the angle of the bevel cut may be continually adjusted. To accomplish this, as well as the angle of cut of the piece, optical sensing means are carried by each of the first and second arms, and scan a first and second profile curve, respectively, drawn or carried around the pipe, or the like. The first profile curve controls the movement of the first arm so that the first arm controls the movement of the bracket supporting the torch. The second profile curve controls a pair of motors which adjust the angle of rotation of the torch, and therefore the angle of the bevel cut.

If the device of the present invention were to be used for welding, all that is required is that the torch be replaced by an electric arc or the like. The pendulum motion of the welding head can be carried out by the angle adjusting means, but otherwise, the operation of the device is the same.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 1 is a schematic plan view of the carriage and sensing means of the present invention.

FIG. 2 is a view taken along line 2—2 of FIG. 2, and shows a holding chain, including tensioning means securing and for rotating the carriage of the present invention about a pipe.

FIG. 2a is an enlarged view of a second embodiment for tensioning the holding chain.

FIG. 3 is a side view of the arms and rack gear on the arms of the present invention.

FIG. 4 is an illustration of one type of profile curves of the present invention used to control the arms shown in FIG. 3.

FIG. 5 is a side view of the rotatable mounting means for the torch of the present invention.

FIG. 6 is a partial plan view, in section, showing the flexible shaft drive for the rotatable mounting means of the present invention.

FIG. 7 is an enlarged partially cross-sectional view of the rotatable mounting means showing the torch of the present invention in rotated positions, and FIGS. 8-13 show the type of cuts the apparatus of the present invention may achieve.

DETAILED DESCRIPTION OF THE INVENTION

The present invention will now be discussed with reference to the accompanying drawings in which the apparatus is illustrated as being employed to cut pipe.

In FIG. 1, a pipe 1 which is to be cut is shown. Mounted on the pipe 1 is a carriage 2 of rectangular cross-section, the longitudinal axis of which is adapted to lie generally perpendicular to the axis of the pipe. Carriage 2 has four wheels, or rollers, 3, 4, 5 and 6 rotatably mounted on the underside of the carriage 2 on axles extending perpendicular to the longitudinal axis of the carriage. Such wheels have a coating of rubber therearound for providing proper contact between the pipe and the wheels as the wheels rotate around the pipe. The rubber coated wheels further compensate for any irregularity in the surface of the pipe, by being compressed, as required, under action of a tension torque holding belt, as to be described. Two wheels 5 and 6 are driven by a reversible motor 7 through a chain 8 positively driven by a sprocket mounted on the shaft of the motor 7. The chain 8 drives an axle 9 connecting the wheels 5 and 6 through a sprocket arranged on the axle 9. Although it has been shown that only the wheels 5 and 6 are driven by the motor 7, it is well within the purview of the present invention to drive the wheels 3 and 4 in lieu of the wheels 5 and 6, or to drive all four wheels. It is also possible to drive the wheels 5 and 6 so as to rotate the carriage 2 around the pipe in one direction, and to drive the wheels 3 and 4 oppositely so that the carriage may be rotated about the pipe in the opposite direction, one or the other pair of wheels being used at any one time. Rather than a chain transmission, a pully and belt transmission, or direct gear drive may be used.

In FIG. 2 there is shown the arrangement for effecting stable rotation of the carriage 2 about the pipe 1. Projecting from the carriage 2, on opposite sides thereof, are two bracket arms 10 and 11, each bracket arm extending from the carriage perpendicular to the length of the pipe. Bracket arms 10 and 11 support a chain 12 extending circumferentially about a portion of the pipe. The chain 12 is made up of series of paired straight links 13 and hooked links 13a interconnected by axle pins 14 and 14a. Each link comprises a pair of arms held in parallel spaced relationship by the axle pins. The axle pins 14 extend laterally from the free end of the straight links 13 enabling the hooked end of the links 13a to be removably secured to them. The central axle pin 14 securely holds the two links of each pin together and journals a roller 15 between the arms. It is thus observed that the length of the chain can be adjusted by removal or insertion of one or more of the paired links. The use of the hook links in conjunction with adjustable tensioning means described herein, enables the chain to be fastened and unfastened about the pipe. Since only the rollers 15 engage the surface of the pipe, the carriage and chain can move easily about the pipe.

In order to attach the carriage 2 to the chain 12, and simultaneously insure sufficient tension to maintain the carriage in proper position driving operation, and even during rotation about the pipe, there is provided a tensioning means 16 connected at one end to the end 17 of the chain, and at its other end to the bracket 11. The tensioning means 16 has a box-like frame 18 in which is mounted a tension spring 19. The spring 19 is positioned within the frame 18 for adjustable movement. As can be seen in FIG. 2, this is accomplished by a rod 20, extending through the frame 18, having one end connected to the end 17 of the chain 12, and having its other end formed with threads so as to receive a nut 21. The frame 18 is connected by a second arm 20a fixed at the upper end of the body to the bracket arm 11 so that upon rotation of the frame 18 the effective length of the tensioning spring 19 is alternatively reduced or expanded. The length of adjustment of the turnbuckle should preferably be at least the equivalent of each pair of chain links 13 and 13a so that accurate adjustment of the length of the chain could be made to fit any diameter pipe. Once properly adjusted the tension spring will have ample force so as to maintain stability while allowing the unit to rotate about the pipe.

The other end 22 of the chain 12 is connected to the bracket arm 10 by a turnbuckle 23 of conventional design. The turnbuckle 23, upon being rotated, will, depending upon the direction of rotation, either bring the chain end 22 closer to or farther from the bracket arm 10. The tensioning device 16 is provided with a pin 21b fixed for example to the washer 21 and protruding through a longitudinal slot in the body 18. Incremental indicia, such as grooves or marks, are formed on the outside of the body adjacent the slot. As a result, when the turnbuckle 23 is rotated to tighten the chain 12, the degree of tension on the chain is indicated by the position of the pin 21b along the slot. Once the proper degree of tension is obtained, it can thereafter be maintained throughout the operation of the device, simply by maintaining the adjustment so that the pin 21b rests against the same given indicia mark. The tension is preferably predetermined so that as the wheels 5 and 6 are driven by the motor 7, the entire arrangement is unitarily rotated about the pipe. That is, the carriage and chain 12 together form a rotating unit firmly seated about the pipe.

A second form of tensioning means is shown in FIG. 2a wherein the rod 20 is provided at its free end with a pair of laterally extending pins 21a which extend between the helices of the coil spring which is fixed at its lower end to the bottom wall of the body. Rotation of the body 18, relative to the rod 20, itself fixed to the chain 12, will move the pins 21a axially along the length of the coils and thereby selectively vary the effective length of the coil. To permit the body 18 to rotate the arm 20a passes freely through the upper wall of the body, and is held in place by nut 20b threaded to its end.

The carriage 2 supports, for slidable movement therein, a tool carrying frame formed by a triangular array of arms, 25, 26 and 27 and an arm 31 set between them, each suitably journalled, for free reciprocation through the carriage. Arms 25 and 31 are shown offset in FIG. 1 for clarity. The arms are of suitable beam type members, providing stable cantilevered support for members mounted at either end. The arms 26 and 27 are arranged opposite each other in a common horizontal plane and are attached together by a transverse plate 28 at their rear most ends through which arm 31 passes. All of the arms 25, 26 and 27 are joined together at their foremost end by a frame or plate 29 which serves as a tool holder. The arm and plates 28 and 29 can be fastened in suitable manner, preferably by welding. The opposed transverse walls of the carriage 2 have a triangular-shaped cut-out 30 allowing for the slidable movement of the frame within it. The triangular array of arms provides greater support particularly since the arms may be mounted to slidably engage in the vertices of the respective angles of the cut-out. All of the arms, including 26, 27, 28 and 31, are mounted for slidable movement in any conventional manner, for example, by opposed roller bearings, journals etc. (not shown in the drawing). For clarity the interior of the carriage is shown as hollow. It will however be appreciated that the exterior comprises suitable frame members, brackets etc. to support the bearing journals etc. mounted therein. The arms 25, 26 and 27 extend parallel to the transverse axis of the carriage 2.

Also slidably mounted to freely reciprocate through the carriage, parallel to the arms 25, 26 and 27 is a sensing arm 31. The arm 31 is supported in end frame 28 and in at least the rear wall of the carriage 2 by suitable bearing members. As can be seen in FIG. 3, the frame arm 25 is formed with a rack gear along its bottom face, while the sensing arm 31 is formed with a rack gear on its side face. The rack gear of arm 25 engages with a pinion 33 affixed to the shaft of a reversible motor 34 mounted vertically within the carriage. The rack gear of the arm 31 engages with a pinion 35 affixed to the shaft of a reversible motor 36 mounted horizontally within the carriage.

Mounted on the rear end of each of the arms 25 and 31 in such a manner as not to interfere with each other (i.e., by being mounted along opposite edges) are optical scanners 37 and 38, repectively (see FIG. 1). Directly below the scanners 37 and 38 there is to be independently provided a pair of profile curves 39 and 40, respectively. Profile curves 39 and 40 may be separately drawn directly on the pipe 1, or alternatively may be drawn on paper or the like and wrapped around the pipe. Profile curve 39 serves to control through a signal output of sensor 37 a pair of motors 41 and 42 (described below) that position the tool at any desired angle with respect to the surface of the pipe and selectively with respect to each of the longitudinal and transverse axes of the pipe. As will be seen the latter tool is adapted to assume a position in any direction relative to the center of the pipe so that any cut, bevelled, perpendicular or otherwise can be made. The tool can take any angle of attack or attitude, in a radial plane, a chordal plane, or angular to either.

Profile curve 40 serves to control the motor 34, such that, upon the scanner 38 generating electrical signals in response to the pick-up from the curve 40, the motor 34 will move the arm 25. Such movement of the arm 25 will move the tool back and forth along the length of the pipe in accordance with the electrical signals generated by the scanner 38 since arm 25 is fixedly connected to the tool holder 29 at its opposite end (see FIG. 5).

In order that the optical scanner 37 be kept along the path of the profile curve 39, the output from the scanner 37 is fed to the motor 36. The motor 36 will move the arm 31 carrying the scanner in response to such signals so as to keep the scanner along the curve as the entire unit rotates around the pipe. The output from scanner 37 also signals motors 41 and 42 to angularly position cutting head 51.

It can be seen, therefore, that the motors 34 and 36 control the movement of the arms 25 and 31, respectively, so as to keep their associated scanners along the profile curves notwithstanding the movement of the carriage around the pipe. In addition, the movement of the arm 25 is controlled by the motor 34, so that it will move the tool at its forward end along a longitudinal direction parallel with the length of the pipe. Simultaneously, the control by scanner 37 of the two motors 41 and 42 can cause the tool to assume any desired angle with respect to surface while the carriage and arms attached thereto rotate around the pipe. If the tool is a cutting instrument, such as a torch, a bevel cut of any angle can be made and even varied continually, if desired. It is noted that the profile curves should be drawn or attached to the pipe at a distance from the carriage, in dependence upon the lengths of the arms 25 and 31. Such distance may be chosen, along with the lengths of the arms, so that the carriage may be moved from one position on the pipe to another in order to cut numerous pieces.

Several optical scanners are well known. These scanners may operate so as to sense the amount of reflected light from the profile curves 39 and 40, the intensity of such light directly controlling the output voltage from the scanners. For this reason, the area between the profile curves 39 and 40 may be blackened as shown in FIG. 4. On the other hand, scanners are known, which are capable of following a line or track, and which compensate for variation therefrom. These two will also provide an output dependent upon such variations. Reference for example can be made to an electronic line tracer and control for known flame cutting, routing arc-cutting, sewing and sawing operations sold under the trade name LINATROL models HL-10T and HL-10c, HL-70, HL-71 and HL-72, manufactured and sold by Canadian Westinghouse Company Limited, Electronic Systems Division, P.O. Box 510, Hamilton, Canada. Such device comprises a portable sensing head capable of mounting at the end of a movable arm and an amplifier and control means capable of mounting within the body, or remotely of the present unit. In the model HL-70 a co-ordinate drive tracing control means having at least two drive outputs is provided. This latter unit is particularly adaptable to read the single line curve 39 and to control both of the motors 41 and 42 for positioning the tool, as well as for moving the arm 31. A similar sensing and control device may be employed as "sensor" at the end of arm 25. In the present disclosure, the sensors 37 and 38, motors 34, 35 and 41, 42, as well as the motor 7 are illustrated separably, it will be appreciated that these units, together with the signal amplifiers, control circuits, etc. for converting the sensed signal into a power impulse can be combined into the signal package of the LINATROL described.

With reference to FIG. 5 it will now be discussed how the tool which may be a torch, a welding head, paint spray, scrubber etc. may be mounted on the end of the support frame and how its angle of attack may be varied. The tool which for illustration only is depicted as a torch, comprises a body 50 and a head 51 adapted to receive oxygen and fuel via inlet lines 52 and 53 respectively.

The tool is mounted so as to be selectively rotatable in a broad cylindrical path, or swivable to assume any angle of attack. To accomplish this, torch body 50 is attached by means of universal swivel joints 54 to a pair of vertically spaced bearing members generally depicted by the numerals 55a and 55b which are suitably secured in cantilevered fashion from the frame carrier plate 29. The bearing members are preferably mounted on removable brackets, so that the tools can be exchanged. A dovetail type bracket and slot 59 as seen in FIG. 6 is suitable.

As seen in detail in FIG. 6, each bearing (only one is illustrated) comprises an inner ring 56, an outer race ring 57 and a plurality of rollers 58 interposed therebetween, in two parallel rows. The inner and outer rings are secured together by annular retainers 60 and 61. The retainer 60 is secured by screws 62 to the outer ring and extends over the inner race ring ending in a depending skirt 63 which fits slidably into an annular slot 64 formed in the inner race. The other retaining ring is secured by screws 65 to the inner ring, extends radially outward and is formed with a skirt 66 fitting slidably in a slot 67. In this manner the inner ring is rotatable relative to the outer ring, while the races and rollers lodged therein are effectively sealed from dirt etc. The interior of the bearing may also be packed with lubricant. Formed on the outer circumference of the bearing ring 56 and midway between the edges thereof is a rack gear 68. A flexible shaft 69 (such as a bowden cable) connected to one of the two motors 41 and 42 controlled by the sensor 37 is received in a cut-out hole 70, extending axially through the outer bearing ring 57. A pinion 71 is fixed at the end of the cable meshing with the rack gear 68 so that upon rotation of the flexible shaft, the tool bearing ring 56 will rotate within the outer ring 57.

The flexible shaft 69 from one of the bearings is connected to the output shaft of motor 41 while the flexible shaft of the other bearing is connected to the output shaft of motor 42 (see FIG. 1) which motors are controlled by the scanner 37 as described above. The connection between the flexible shaft 69 and the shaft of the motor 41 may be achieved by any conventional arrangement.

As shown in FIG. 7, the torch 50 may be rotated to any desired angle. By separately rotating the upper tool bearing ring and/or the lower tool bearing ring 57, any desired angle of attack of the torch can be obtained. It is to be noted that the torch 50 is secured to a portion on the inner circumference of the torch carrier ring 56, and is mounted in the universal ball-socket joint so that it swivels relative to the bearing ring 57. To effect this the universal ball joint comprises a socket 72 fixed to the inner bearing ring 56 and a ball 73 secured by a band 74 surrounding the tool. The band 74 associated with the upper tool bearing ring 56 is provided with an annular coil spring 75 which constricts about the torch body 50, thus holding of the tool in place, but permitting the tool to move or slide. The band 74 located in association with the lower tool bearing ring is adapted by a screw, bolt or other fastener to be fixed absolutely to the torch body so that there is no relative movement at this end. This is necessary since the distance between those portions of the torch body secured to the bearing rings must change on relative rotation of the rings if any desired angle is to be achieved while maintaining the end point of the torch, or tool, at a relatively fixed distance from the surface of the work piece. For example, the linear distance between the contact point A and B and between A' and B' etc. will differ depending upon the relative rotation of the bearing rings.

Thus, each tool bearing ring may be rotated separately 360° about, with any fraction of 360° possible, relative to each other, with the tool assuming any angular position, but with the distance from its working end to the work surface remaining constant.

While it has been shown that both the top and the bottom tool bearing rings are rotated, it is within the scope of the present invention that only one ring be rotatable. Further, the flexible shaft coupling with each bearing ring is given only by way of example, and may take on different configurations, and still be within the scope of the present invention. For example, the flexible shaft need not extend through the outer ring-shaped frame, but may engage the torch carrier ring by providing the rack thereof on the circumferential top edge of the carrier ring.

In a similar manner, the outer frame need not be ring-shaped but could take on many shapes as long as the carrier ring is adequately supported thereby.

It can be seen that the present invention may be used in a number of ways. Although reference has been made in the present description to cutting pipes, it is well within the scope of the present invention to use same for cutting plates, tank ends, and the like, and for cutting holes in these members. On non-cylindrical work pieces, the carriage may be caused to rest on the ground or on the work piece itself without the chain, and may be caused to move, linearly in the plane of the work piece rather than circularly about it.

The tool of the present invention may be rotated 360° for cutting holes of numerous diameters and shapes. By rotating the top carrier ring 56 to any desired position, and then rotating the bottom carrier ring 360°, a hole may be cut of specified diameter. By again rotating the top carrier ring 56 to a new position, and then again rotating the bottom carrier ring 360°, another hole of different diameter may be cut. The angle of the bevel can also be similarly varied, it being appreciated that such adjustment can be made at any time even during the operation of the tool, so that the angle of attack, may be made to change, constantly.

The angle of bevel, that is the angle the edge of the material is caused to be cut at, relative to the two surfaces of the material work piece, depends upon the angle of attack of the tool, relative to the surface of the work piece. Thus, if the tool is held perpendicular to the surface, a square cut or bevel is obtained, if the tool is angled at 45° to the surface while being maintained in a radial plane to the center of the work piece a 45° bevel will be obtained which is conical about the work piece. If the tool is varied in angular disposition, saddle cuts with changing bevels can be obtained. The over all shape of the opening in the work piece, or the cross sectional cut of the work piece, does not depend so much on the angle of attack, but on the movement of the tool frame and carriage respectively. If it is to be assumed that the carriage may reciprocate along an axis X, and the frame bracket along an axis Y, which intersect, the tool will then be understood to rotate as well as swivel about an axis Z which may or may not intersect axes X and Y dependent upon the relative positions of the bearing rings relative to each other.

The operation of the preferred embodiment as shown in FIGS. 1–7 will now be described. The carriage 2 and chain 12 are first placed around a pipe 1 to be cut. Motor 7 is energized and rotates the carriage and chain about the pipe. The motor 7 is controlled so that the speed and direction of rotation conforms to the type of cut to be made, and bear relationship to the speed at which the tool torch is capable of cutting the pipe. Scanner 38 at the end of the arm 25 will generate signals in response to the profile curve 40 as the carriage 2 rotates about the pipe. These signals, which vary in accordance with the amount of reflected light, will control the motor 34 to move the arm 25 in accordance therewith. Such movement of the arm 25 will cause selected reciprocal movement in the axial direction of the torch as the carriage and torch rotate around the pipe.

Scanner 37, attached to the end of the arm 31, will generate signals in accordance with the profile curve 39, such signals first controlling the motor 34 to move the arm 31 back and forth to keep the scanner 37 along the curve. The signals from the scanner 37 also control the motors 41 and 42 which rotate the flexible shafts 69 for rotating the bearing rings 56. Thus, the torch carrier rings will rotate in accordance with the signals generated by the scanner 37 to effect a cut of desired shape as well as a bevel of desired shape.

In FIGS. 8-13, the different cuts achieved by the invention are shown. FIG. 8 shows a constant angle cut of a pipe where the bevel is held constant.

FIG. 9 shows a saddle cut where the bevel is held constant, and FIG. 10 shows a saddle cut where the bevel is changed along the surface cut.

FIG. 11 shows a hole 76 in a pipe cut with the present invention, and FIG. 12 shows different cut-outs in a plate 80. These cut-outs, as shown, are a circular hole 81, an elliptical hole 82, and a gear shaped hole 83.

FIG. 13 shows two shapes cut on the edges of a plate 80'. The first cut 85 is a simple straight cut, and the second cut 86 is one of irregular shape.

Innumerable other shapes may be formed by the apparatus of the invention, of which the above are only suggestive.

While a specific embodiment of the invention has been shown and described in detail to illustrate the application of the inventive principles, it will be understood that the invention may be embodied otherwise without departing from such principles.

What is claimed is:

1. Apparatus for cutting, welding or otherwise working pipe, sheet, plate or similar work pieces comprising a carriage movable in a first axis parallel to the surface of said workpiece, an elongated bracket mounted on said carriage for reciprocal movement in a second axis angular to the first axis and parallel to the surface of said workpiece, a tool having a longitudinal axis, means for mounting said tool on said bracket relative to a third axis distinct from the longitudinal axis of the tool, said third axis being perpendicular to both the first and second axes and angular with respect to the surface of said workpiece, said means for mounting said tool holding said tool at two points spaced along the longitudinal axis of said tool and being adjustable at each of said points to selectively vary the position of the longitudinal axis in a plurality of linear directions with the holding points lying on an imaginary cylinder concentric with the third axis, and means for simultaneously controlling in response to a predetermined program the path of movement respectively for each of said carriage and bracket in each of said first and second axes and the adjustment of the means for mounting said tool to thereby continuously cause said tool to work said workpiece along a combined selected path at selected angles to the surface.

2. The apparatus according to claim 1, wherein said predetermined program comprises at least one profile pattern, said means for controlling said carriage, bracket and tool includes means for sensing said pattern and motor means individually responsive to said sensing means for selectively moving each of said carriage, bracket and tool.

3. Apparatus for cutting, welding or otherwise working pipe, sheet, plate or similar workpieces comprising a carriage movable in a first axis parallel to the surface of said workpiece, an elongated bracket mounted on said carriage for reciprocal movement in a second axis angular to the first axis and parallel to the surface of said workpiece, a tool, means for mounting said tool on said bracket in a third axis angular to both the first and second axes and angular with respect to the surface of said workpiece, said means for mounting said tool being adjustable to selectively vary said third axis relative to said first and second axes and relative to the surface of said workpiece, and means for simultaneously controlling in response to a predetermined program the path of movement respectively for each of said carriage and bracket in each of said first and second axes and the adjustment of the third axis to thereby continuously cause said tool to work said workpiece along a combined selected path at selected angles to the surface, said predetermined program comprises at least one profile pattern, said means for controlling said carriage, bracket and tool includes means for sensing said pattern and motor means individually responsive to said sensing means for selectively moving each of said carriage, bracket and tool, said means for adjustably mounting said tool at an angle to said workpiece comprises first and second rotatable bearing rings mounted coaxially and spaced one above the other, means for securing said tool to the upper bearing ring for slidable and pivotal movement relative therewith, means for securing said tool to the lower bearing ring for pivotal movement only relative therewith, and motor means for independently rotating each of said bearing rings responsively to said predetermined program.

4. The apparatus according to claim 3, including a first arm slidably mounted in said bracket, an optical scanner mounted at the end of said arm which senses the light reflected from the profile pattern, a first motor for rotating one of said inner tool bearing rings, a first flexible shaft connected to said first motor and positively engaged with said one tool bearing ring, a second motor for rotating the other inner tool bearing ring, and a second flexible shaft connected to said second motor and positively engaged with said second carrier ring, said control means including means for differentiating the output of said sensing means for electrical regulation of said first and second motors simultaneously.

5. The apparatus according to claim 4, wherein each of said bearing rings are rotatably journalled in an outer bearing ring fixedly secured to said bracket and said flexible cable is provided with a sprocket at one end interposed between said outer and inner rings, said inner bearing ring having a rack about its periphery engaged with said sprocket.

6. The apparatus according to claim 5, including a second arm fixedly connected to said bracket, a second optical scanner mounted at the end of said arm sensing the light reflected from said profile pattern, a third motor for moving said bracket in said carriage, said third motor means being electrically connected to said second optical scanner.

7. The apparatus according to claim 6, including a fourth motor for driving said first slidable arm, said fourth motor being electrically connected to said second optical scanner to move said first arm in response to the output of said second optical scanner simultaneously with the movement of said bracket.

8. The apparatus according to claim 6, wherein said carriage further comprises a plurality of wheels adapted to rest on the surface of the workpiece, at least one of which is positively driven to move said carriage in one direction on said workpiece.

9. The apparatus according to claim 8, including means for guiding said carriage about the surface of a pipe, comprising a chain, a first bracket arm and a second bracket arm extending from opposite sides of said carriage, a turnbuckle having one end connected to a first end of said chain and the other end to said first bracket and a tensioning means having one end connected to a second end of said chain and the other end connected to said second bracket arm, said chain mounting said carriage about a pipe for rotation thereabout.

10. The apparatus according to claim 8, wherein said tensioning means comprises a spring and includes means for varying the effective length or tension of said spring.

* * * * *